United States Patent
Habib et al.

(10) Patent No.: US 6,908,355 B2
(45) Date of Patent: Jun. 21, 2005

(54) PHOTOCATHODE

(75) Inventors: Youssef M. Habib, Lancaster, PA (US); John G. Bryan, Middletown, PA (US); Charles W. Stoll, Mountville, PA (US); John W. Steinbeck, Fitzwilliam, NH (US)

(73) Assignee: Burle Technologies, Inc., Oxford, CT (US)

( * ) Notice: Subject to any disclaimer, the term of this patent is extended or adjusted under 35 U.S.C. 154(b) by 0 days.

(21) Appl. No.: 10/293,014

(22) Filed: Nov. 13, 2002

(65) Prior Publication Data

US 2003/0222579 A1 Dec. 4, 2003

Related U.S. Application Data

(60) Provisional application No. 60/351,308, filed on Nov. 13, 2001.

(51) Int. Cl.[7] .................................................. H01J 9/12
(52) U.S. Cl. ........................................... 445/50; 445/51
(58) Field of Search .............................. 445/30, 50, 51; 313/530, 523, 531, 544, 346 R, 527, 542, 543; 250/214 VT

(56) References Cited

U.S. PATENT DOCUMENTS

| | | | |
|---|---|---|---|
| 3,387,162 A | | 6/1968 | Schagen et al. |
| 3,814,968 A | | 6/1974 | Nathanson et al. |
| 3,913,218 A | * | 10/1975 | Miller .......................... 438/20 |
| 4,208,577 A | * | 6/1980 | Wang .................... 250/214 VT |
| 4,209,705 A | * | 6/1980 | Washida et al. ......... 250/486.1 |
| 4,236,077 A | * | 11/1980 | Sonoda et al. ........... 250/361 R |
| 4,591,717 A | * | 5/1986 | Scherber ................... 250/338.1 |
| 5,277,960 A | * | 1/1994 | Tsuya et al. ................. 428/119 |

* cited by examiner

Primary Examiner—Joseph Williams
Assistant Examiner—Glenn Zimmerman
(74) Attorney, Agent, or Firm—Lerner, David, Littenberg, Krumholz & Mentlik, LLP

(57) ABSTRACT

An electron-emitting photocathode includes a base and a large number of projecting elements such as microscopic wires projecting from a surface of the base. The photocathode has high quantum efficiency, and hence can be used as the emitting element in a sensitive phototube.

6 Claims, 4 Drawing Sheets

PHOTOCATHODE

CROSS-REFERENCE TO RELATED APPLICATIONS

This application claims benefit of U.S. provisional application Ser. No. 60/351,308, which was filed on Nov. 13, 2001, the disclosure of which is hereby incorporated by reference herein.

BACKGROUND OF THE INVENTION

The present invention relates generally to photocathodes, to devices incorporating photocathodes, and to methods of making photocathodes.

A photocathode is an opto-electronic device that emits electrons when it is struck by photons of light. A photocathode typically is used in a vacuum tube with an anode structure. In the simplest case, the anode structure can be a simple plate, where electrons emitted from the photocathode pass directly to the anode structure. In this simple structure, the current passing through the device is essentially equal to the number of electrons emitted by the photocathode. In more complex structures, e.g., photomultiplier tubes, the anode structure includes known electron-multiplying devices such as microchannel plates and dynodes. These devices act to emit large numbers of electrons in response to a few electrons emitted by the photocathode. In such a tube, the current passing through the device is many times greater than the emission current from the photocathode, i.e., the number of electrons emitted from the photocathode. In all of these structures, however, the current passing through the device is directly related to the emission current from the photocathode. Thus, to make a device that is highly sensitive, it is desirable to use a photocathode with a high quantum efficiency, i.e., a photocathode which emits a relatively large number of electrons for a given amount of light impinging on the photocathode. This is especially desirable where the device is used to detect extremely dim light as, for example, in so-called "single photon detectors" used in certain scientific applications. A single photon detector is intended to provide a measurable electrical current in response to a single photon impinging on the photocathode.

Conventional photocathodes are formed by depositing a layer of polycrystalline material on a planar substrate. The layer of polycrystalline material forms the photoemissive surface for absorbing the light and releasing the electrons. The photoemissive surface of a conventional photocathode is relatively smooth and of the same size as the underlying substrate. The planar substrate is formed of an electrically conductive material and is electrically coupled to the polycrystalline layer.

The quantum efficiency of a photocathode is the ratio of the number of released electrons over the number of incident photons of a given wavelength. The maximum efficiency is 100%. Conventional photocathodes have a peak quantum efficiency of 25% at a materials dependent wavelength between the range of 200 nm–900 nm. This means that approximately 75% of the incident photons do not cause emission of electrons.

There exists a need for photocathodes that have high quantum efficiency and for devices incorporating such photocathodes. There also exists a need for a method to manufacture these high quantum efficiency photocathodes.

SUMMARY OF THE INVENTION

One aspect of the present invention provides a photocathode that includes a base and a plurality of elements projecting outwardly from the base. For example, the projecting elements desirably may be in the form of elongated microscopic wires referred to herein as "nanowires", and desirably project substantially parallel to one another in a direction normal to the base. The base may be a platelike or sheetlike element formed integrally with the projecting elements. For convenience, the base is referred to herein as extending in "horizontal" directions, and the elements are referred to herein as projecting in a "vertical" direction. Merely by way of example, the projecting elements may each have an equal height in the vertical direction, and such height may be, for example, between 0.1 $\mu$m and 200 $\mu$m. The projecting elements also may be, for example, between 4 nm and 200 nm in diameter. The projecting elements may be disposed as an array of elements that are evenly distributed over at least part of the base. Such an array may incorporate a vast number of individual elements as, for example, $10^9$ to $10^{13}$ elements per square centimeter of base area covered by the array.

The projecting elements are adapted to emit electrons upon absorption of light, and hence form a part or all of the photoemissive surface of the photocathode. Thus, the projecting elements may incorporate a low-work function material at their respective surfaces. As further discussed herein, the "work function" of a material is a measure of the energy required to eject an electron from the material into vacuum. Preferably, the low work function material has a work function less than about 2 electron volts (ev). Merely by way of example, materials such as alkali metals, alkali metal antimony compounds, cesium, cesium oxide, diamond, silicon, carbon nanotubes, III–V compound semiconductors and combinations thereof can be used.

The projecting elements provide the photocathode with a large photoemissive surface area to absorb photons from a light source. Thus, the surface area of a cathode in accordance with this aspect of the invention is substantially greater than the surface area of the base. Although the present invention is not limited by any theory of operation, it is believed that a relatively large photoemissive surface area contributes to an improved quantum efficiency of the photocathode. It is also believed that the small size of the projecting elements further facilitate electron emissions from the projecting elements. Moreover, although here again the present invention is not limited by any theory of operation, it is believed that the elements serve to intensify the electrical field in locations such as the tips of the elements, which in turn facilitates electron emissions from the photocathode. This increases the likelihood that light absorbed by the photocathode will result in a released electron, and thus increases the quantum efficiency of the photocathode.

As discussed in more detail hereinafter, the size of the elements can be designed to improve the absorption of light having a particular wavelength. This can include light in either the visible spectrum or the invisible spectrum. For example, the length or height of each of the elements can be designed to resonate with the wavelength of light received by the photocathode, which increases the likelihood that the light will be absorbed and not reflected by the elements.

A further aspect of the invention provides phototubes that incorporate an anode structure, a photocathode as discussed above, and an enclosure maintaining the photocathode and the anode structure in a vacuum. The projecting elements desirably extend from the base in a direction towards the anode structure. Such a phototube can be used in conjunction with a potential source connected to the anode structure and to the photocathode. In operation, the anode structure is maintained at a positive electrical potential relative to the photocathode. As discussed above, the geometrical attributes of the elements and the positioning of the photocathode results in enhanced electric field strength particularly near the tips of each of the elements, which facilitate the ejection of electrons from the photocathode. The anode structure may be a simple anode or may include an electron-multiplying device.

In accordance to yet another embodiment of the invention, there is described a method of making a photocathode comprising the steps of providing a template having a plurality of pores with each of the pores having an open end, forming elements by depositing a material in the pores of the template, providing a base that is electrically connected to the elements, and removing a least a portion of the template so as to expose the elements. The exposed portion of the elements can further be coated with a low work function material.

DETAILED DESCRIPTION

Figure 1A:
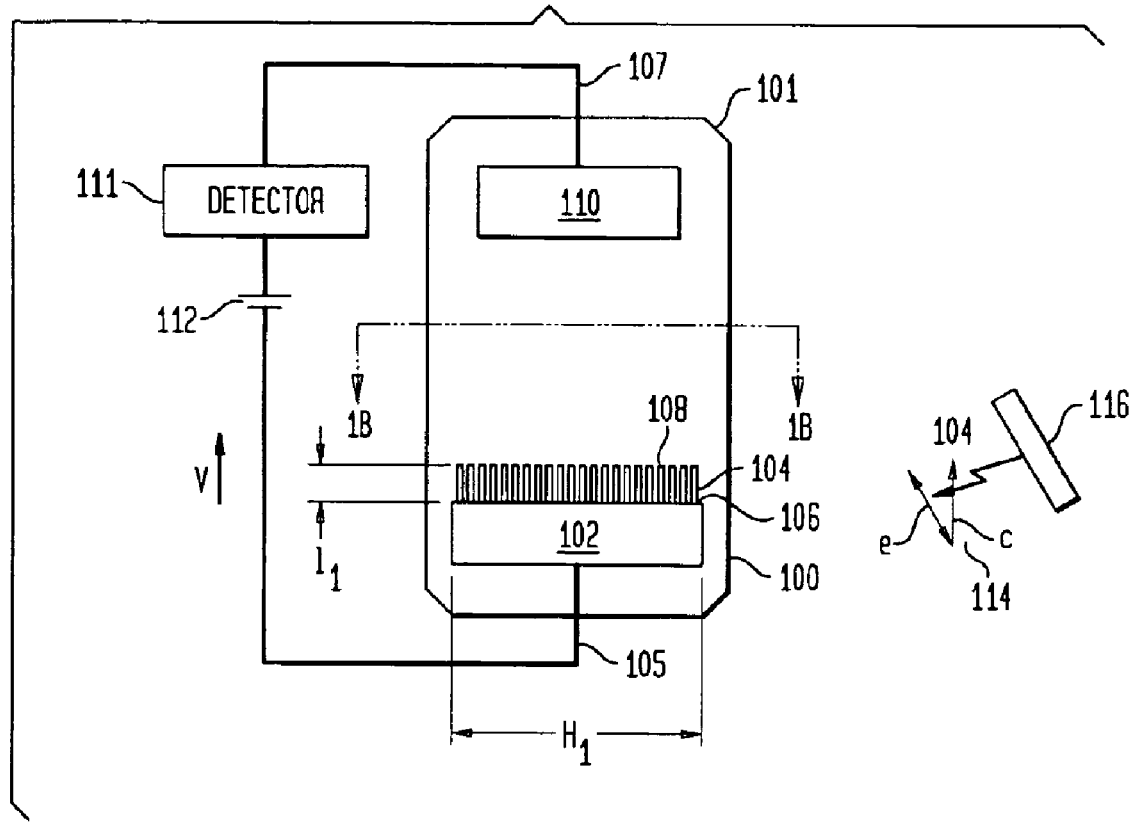
FIG. 1A is a diagrammatic elevational view of a phototube according to one embodiment of the invention.
Figure 1B:
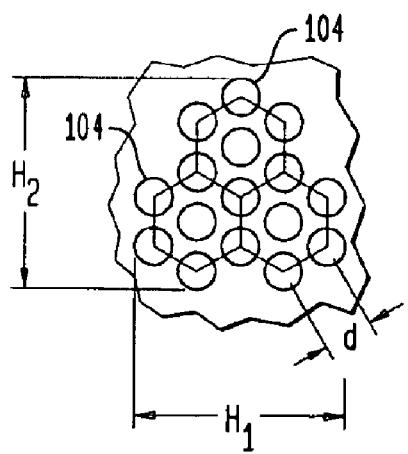
FIG. 1B is a fragmentary, diagrammatic view on an enlarged scale taken along line 1B—1B in FIG. 1A.

Referring now to the drawings wherein like reference numerals represent like elements, there is shown in FIG. 1 a phototube 101 having a photocathode 100 according to one embodiment of the invention. The photocathode 100 has a generally planar base 102 with a plurality of elements or projections 104 that extend from a surface of the base 102 in a direction perpendicular to such surface. The directions $H_1$ and $H_2$ (FIG. 1B) along the surface of the base are referred to herein as the "horizontal" directions, whereas the direction V (FIG. 1A) towards and away from the surface of the base is referred to herein as the "vertical" direction. The extent of projections 104 in the vertical direction from the surface of base 102 is indicated by $I_1$ in FIG. 1A.

The base 102 may be formed from essentially any electrically conductive material as, for example, a metal or semiconductor. The elements or projections 104 may be formed entirely of a electron-emitting material having a low work function, desirably less than about 2 ev and more desirably less than about 1 ev. Suitable electron-emitting materials are well known in the art. Examples include alkali metals, alkali metal antimony compounds, cesium, cesium oxide, diamond, silicon, carbon nanotubes, III–V compound semiconductors and combinations thereof. In the alternative, the elements 104 can include an electrically conductive structural material such as a metal or semiconductor coated with a low work function electron-emitting material. For example, metals such as nickel, gold, silver and combinations thereof can be employed as structural materials. Also, the electron-emitting material may be formed by reaction of another material with the structural material at the surfaces of the elements 104.

The elements 104 are in electrical contact with the base 102. As further discussed below, the elements 104 optionally may be formed integrally with the base 102. The elements 104 are sized and shaped to increase the quantum efficiency of the photocathode 100. Each of the projecting elements 104 preferably is a narrow, elongated structure with a base 106 and a tip 108. Preferably the elements 104 each have a diameter that is between 4 nm–200 nm and a length that is between 0.1 μm–200 μm. The elements 104 are uniformly distributed along the surface of the base 102 at a density between $10^9$ to $10^{13}$ elements per square centimeter. As best seen in FIG. 1B, the elements 104 are disposed in a hexagonal array. The elements 104 provide the photocathode 100 with an active surface area that is substantially greater than a smooth surface of a comparable size. For example, an array of elements 104 having a density of $10^{10}$ elements per square centimeter with each element having a diameter of 75 nm and a length of 2 μm has a surface area that is about 100 times greater than a smooth surface of a comparable size. This increase in surface area increases the likelihood that energy from an incident photon will be absorbed by the photocathode 100.

The phototube 101 depicted in FIG. 1A includes an anode structure 110 and an enclosure 103 encompassing the photocathode 100 and the anode structure 110. The enclosure 103 maintains the photocathode 100 and anode structure 110 in a vacuum, typically at an absolute pressure of less than about $10^{-7}$ Pa. The enclosure 103 is formed, at least in part, from a material transparent to the light to be detected by the phototube 101. The anode structure 110 is depicted in FIG. 1A as a simple, platelike electrically conductive element. In practice, the anode structure 110 may include additional elements such as an electron-multiplying structure as, for example, a dynode chain or microchannel plate. Such electron-multiplying structures are known in the art. Merely by way of example, the electron-multiplying structures described in U.S. Pat. No. 6,384,519, the disclosure of which is hereby incorporated by reference herein, may be employed as part of the anode structure 110. The photocathode 100 is positioned in the enclosure 103 so that the elements 104 project in a direction towards the anode structure 110. The phototube 101 also includes appropriate electrical connections, schematically indicated at 105 and 107, for connecting the photocathode 100 and the anode structure 110 to externally-applied electrical potentials.

A system incorporating the phototube 101 includes a circuit having a source of electrical potential such as a battery 112 coupled to the anode structure 110 and to the electrically conductive base 102 of the photocathode 100. The potential source is arranged to maintain the photocathode 100 at a negative potential relative to the anode structure 110. Where the anode structure 110 includes an electron multiplier, the circuit also incorporates appropriate devices (not shown) for providing the requisite power to the electron multiplier. The circuit further includes a detector 111 adapted to detect current flowing from the anode structure 110.

In the particular embodiment illustrated, the system further includes a light source 116 adapted to provide light to be detected at a preselected wavelength. For example, in a communication system such as a fiber optic communication system, source 116 may be disposed remote from the phototube 101 and connected to the phototube 101 by fiber optic (not shown). Alternatively, the source 116 can include a bandpass filter for selecting light at a predetermined wavelength from an outside source.

In operation, the battery 112 maintains an electrical field between the photocathode 100 and the anode structure 110. The average value of the electrical field, as measured over the distance between the photocathode 100 and the anode structure 110, typically is about 1 to about 1000 V/mm. Electrons are released in a vacuum towards the anode structure 110 in response to the light being absorbed by the elements 104. The resulting current is detected by the detector 111. This current is directly related to the intensity of light impinging on the photocathode 100. For example, in a fiber optic communications system, the intensity of light provided by source 116 varies with the signal being transmitted, and hence the current detected by detector 111 also varies with the signal.

The elements 104 can also be designed to improve the absorption of light of a certain desired wavelength. The length or height (l) of each of the elements 104, as measured from its base 106 to its tip 108, corresponds to the resonant wavelength of light to which the photocathode 100 is designed to absorb. Preferably, the height (l) of each element 104 is substantially equal to:

$$n\lambda/4$$

where n is an integer and λ is the wavelength of the light to be detected. Preferably, n is 1, 2 or 4, and hence the height or length (l) of each projecting element 104 is ½, ¼, or the same as the wavelength of the light to be detected. Preferably, the center-to-center spacing (d) between adjacent elements 104 is less than λ. These conditions result in a photocathode 100 that is more likely to absorb light of the desired wavelength.

The response of the photocathode 100 varies with the polarization of the incident light. The photocathode 100 is more sensitive to light having an electric field vector parallel to the vertical direction V of the photocathode 100, and hence parallel to the length dimension (l) of the elements 104, than to other light. Thus, the light source 116 desirably is arranged to provide polarized light 114 having an electric field vector e with a component c in the vertical direction V.

The shape of the elements 104 also creates a field focusing effect that increases the likelihood that electrons will be released from the photocathode 100. The electric field intensification factor describes the effect that the geometry has on the field strength compared to a planar geometry.

In the illustrated embodiment, the elements 104 are relatively long structures having a small diameter. The electric field strength is concentrated at the tips 108 of the elements 104, which increases the likelihood that an electron will be released in response to the absorption of light. Furthermore, the diameters of each of the elements 104 are relatively small, which further improves the emissions of electrons by the photocathode 100. Although the present invention is not limited by any theory of operation, it is believed that a smaller diameter provides electric field enhancements by reducing the distance by which the charge must flow to reach a surface through which an electron is released. In a structure having a small diameter, the electron must travel a distance of half the diameter to reach an emission surface.

In FIG. 1, the photocathode 100 is shown to have elements 104 that are wire-shaped (e.g., nanowires), that are roughly the same height, and that are uniformly distributed across the entire surface of the flat base 102. However, the invention is not so limited. The elements 104 can have a different shape, can have a wide range of heights, and can be unevenly distributed along a base 102 that is not flat e.g., curved, wavy or pointed.

The photocathode 100 is also shown to be formed of a single structure. In the alternative, the photocathode 100 can be formed of at least two structures. For example, the base 102 can be one structure of one material and the elements 104 can be of another material attached to the base 102.

Figure 2:
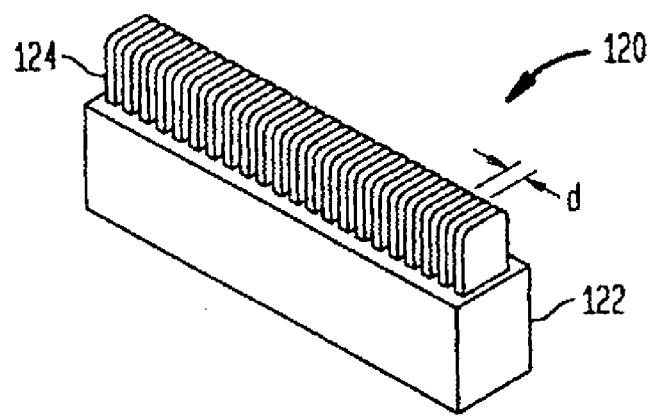
FIG. 2 is a diagrammatic perspective view of a photocathode according to a further embodiment of the invention.

In an alternative embodiment illustrated in FIG. 2, a photocathode 120 has a relatively long and narrow base 122 and elements 124 that extend out from the base 122. The elements 124 are in the shape of fins having a cross-section that is elongated. The platelike elements are disposed in a row and are spaced apart from one another by a distance d.

Figure 3:
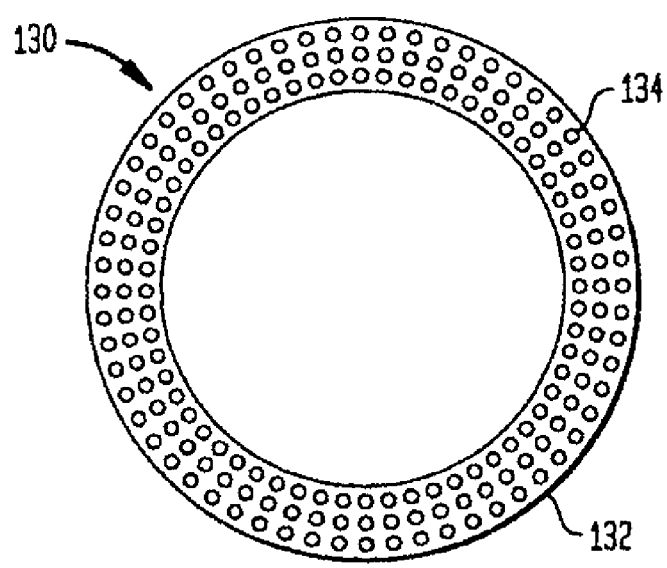
FIG. 3 is a top plan view of a photocathode according to yet another embodiment of the invention.

Referring now to FIG. 3, a photocathode 130 is shown. The photocathode 130 has a disc shaped base 132 and an array of elements 134 that extend from the base 132. In this embodiment, the array of elements 134 extends over only the peripheral portion of the base 132. This embodiment of the invention may be preferable in applications where the incident light strikes only the outer portion of a photocathode 130. This embodiment requires less material to manufacture than a comparably-sized, circular photocathode. Moreover, the elements 134 disposed adjacent the periphery of the base 132 substantially block the light from reaching the center of the base 132. Additional elements near the center of the base 132 would not receive light, but could contribute to the "dark current" or spontaneous electron emission from the photocathode 130. Thus, by omitting the elements 134 adjacent the center of the base 132, the undesired dark current is minimized without impairing the quantum efficiency of the photocathode 130. In a further variant, the central portion of the base 132 also may be omitted, so that the base 132 has a ring-like shape.

Also, in the embodiments discussed above, the projecting elements are of uniform height and are parallel to one another, but this is not essential. For example, the projecting elements may be of random height within a preselected range. Such random-height elements can be formed by processes such as abrasion or dendritic electroplating on the base.

The photocathode is preferably formed by a method that utilizes the physical properties of the material. Two such methods are described below.

Figure 4A:
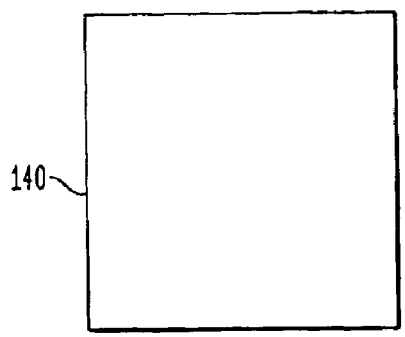
FIGS. 4A–4D are side view representations showing the formation of a photocathode in successive steps of a manufacturing method according to a further embodiment of the invention.
Figure 4B:
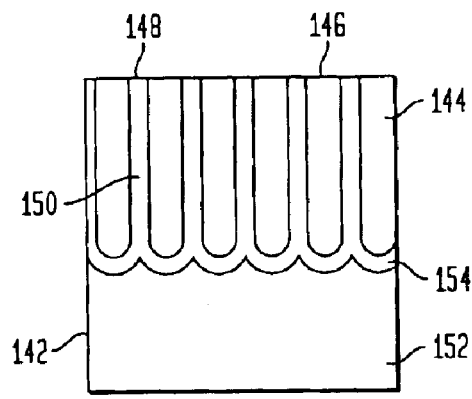

In a first method, which is illustrated in FIGS. 4A–4D, aluminum foil 140 (FIG. 4A) is anodized to form a porous template 142 (FIG. 4B). This technique is well established and is described in detail in the following publications: J. Gruberger and E. Gileadi, Electrochemical Acta, 31, 1531 (1986) and K. Shimuzu, K. Kobayaski, G. E. Thompson, and G. C. Wood, Phiolosophical Mag. A, 66, 643 (1991), which are hereby incorporated by reference. Merely by way of example, the anodizing bath may be an oxalic acid solution. Alternatively, a bath such as $H_3PO_4$ and $H_2SO_4$ can be used.

Referring now to FIG. 4B, the template 142 includes a plurality of channels or pores 144, each having an opening 146 at an outer surface 148. The channels 144 are surrounded by a layer of alumina 150, which insulates the channels 144 from a layer of aluminum 152 beneath the surface 148. The alumina layer 150 is formed during the anodizing process.

In one exemplary process, the porous template 142 is formed by anodizing aluminum 140 in a 0.45 weight percent oxalic acid solution at 80 volts for 30 minutes. The anodization is performed at 2° C. to increase the ordering of channels 144 in the aluminum foil 140 and prevent thermal run away. This treatment yields channels 144 with a 40 nm diameter and 2 μm depth. The alumina layer 150 has a thickness of approximately 40 nm and is formed around each of the channels 144 including at their bottoms 154. This layer 150 forms a barrier between the channels 144 and the layer of unanodized aluminum 152. It is important to overcome this insulating alumnia layer 150 to improve the effectiveness of a subsequent electroplating step.

Figure 4C:
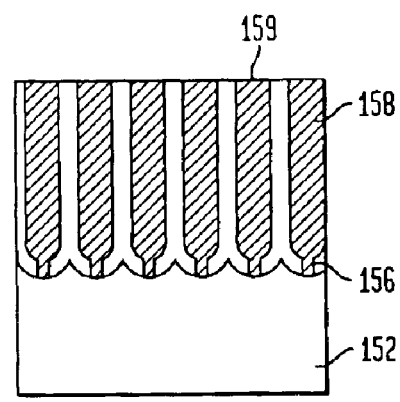
Figure 4D:
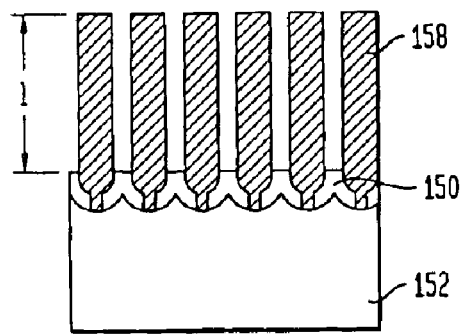

Referring now to FIG. 4C, the alumina layer 150 is overcome by lowering the anodized voltage to 5 volts for 15 minutes. This forms smaller sized channels 156 to bridge the gap between the channels 144 and the aluminum layer 152. The template 142 is then cleaned in water and etched in a 5 wt % phosphoric acid solution. The phosphoric acid etch increases the diameter of the channels 144 to 80 nm and further etches away the alumina layer 150 at the bottom of the channels 144. Accordingly, this step is sometimes referred to as "pore widening".

Following the pore widening step, the structural material 158 which will form the projecting elements of the photocathode is deposited in the channels 144. Electrodeposition of Ni and/or Au into the channels 144 can be performed using an electroplating technique. For example, a nickel-plating bath is mixed with 160 g of nickel sulfamate per liter of water. The solution is buffered with 30 grams of boric acid per liter to keep the pH constant at a value of approximately 4. An electrodeposition bath to produce gold elements 158 or nanowires comprises a solution of potassium gold cyanide and citric acid that is pH controlled using potassium hydroxide and phosphoric acid. A pulse plating technique is used to fill the channels 144 in the porous template 142 to form the elements 158 A 1–5 volt pulse with a 50 $\mu$s width for a 500 $\mu$s period provides satisfactory results. To promote penetration of the electrodeposition solution into the channels or pores 144, the template 142 should be kept wet as, for example, in deionized water, from the time the channels are formed until the template is immersed in the electrodeposition solution. Also, an ultrasonic bath should be used to promote uniform penetration of the electrodeposition solution into the channels 144. After electrodeposition, the template 142, with the formed elements 158 disposed in the channels 144, is mechanically polished so as to form a flat surface 159 remote from the base. Thus, each element 158 is formed to approximately the same length.

After the channels 144 are filled, the elements 158 are then exposed by removing at least part of the template. This is accomplished by etching the template 142 using phosphoric acid, so as to bring the structure to the configuration shown in FIG. 4D. In this configuration, the alumina layer 150 has been etched back to produce a photocathode 160 having projecting elements 158 of length (l). The aluminum layer 152 is electrically connected to the elements 158 and together with the alumina layer 150 forms the base of the photocathode 160. The amount of back etching determines the length (l) of the elements 158. The exposed elements 158 can be further treated by coating them with a layer of a low work function material to improve the quantum efficiency.

Figure 5A:
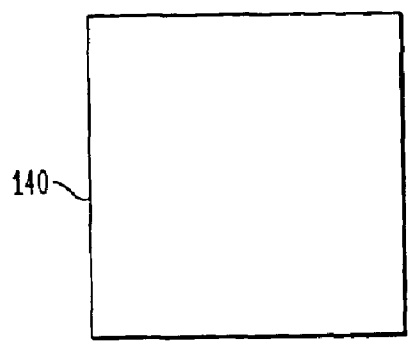
FIGS. 5A–5D are views similar to FIGS. 4A–4D but depicting a method according to another embodiment of the invention.
Figure 5B:
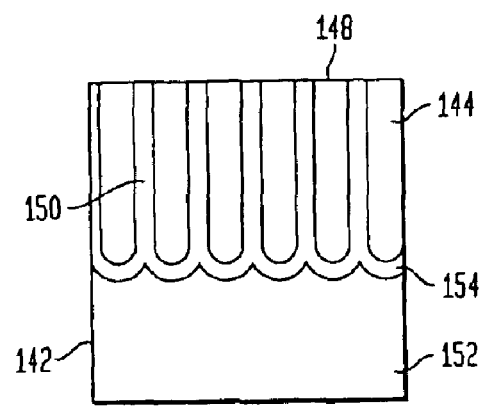
Figure 5C:
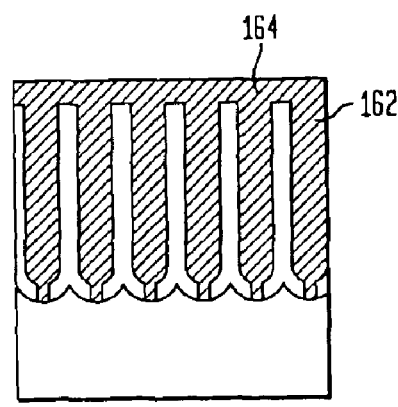
Figure 5D:
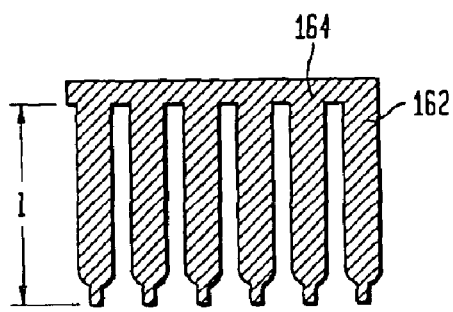

A second method of manufacturing a photocathode is shown in FIGS. 5A–5D. The steps of anodizing the aluminum foil 140 to form the porous template 142, overcoming the insulating layer of alumina 150, and electrodepositing a structural material such as Ni and/or Au to form elements 162 are identical to the first described method. In the method of FIGS. 5A–5D, the electrodepositing step is continued until the deposited material overflows above the outer surface 148 of the template 142 and forms a continuous layer 164 that electrically connects the elements 162. The overflow layer 164, which is illustrated in FIG. 5C, forms a base that is integrally formed with the elements 162. In an alternative method, a separate, electrically conductive element (not shown) can be placed on top of the template 142 after the electrodepositing step to provide electrical conductivity with the elements 162. For example, such a separately-formed layer could be solder-bonded, diffusion-bonded or eutectic-bonded to the formed elements 162 immediately after a polishing step as discussed above with reference to FIG. 4C.

Referring now to FIG. 5C, the elements 162 are then exposed by removing the template 142. This is accomplished by chemically etching off the template 142 with phosphoric acid. In this embodiment, the length (l) of the finished elements 162 is controlled by the depth of the formed channels 144 in the template 142. Optionally, the template 142 can be polished at its outer surface 148 after anodization but before deposition of the structural material so as to control the depth of the channels 144. The exposed elements 162 can be further treated with a layer of a low work function material to improve the quantum efficiency.

As mentioned above, the projecting elements of the photocathode can be treated so as to provide a coating of a low work function, photoemissive material on the surfaces of the elements. This treatment may include processes such as vapor deposition, chemical vapor deposition, sputtering, reactive sputtering, electroplating, or electroless plating. Merely by way of example, antimony can be applied on a metallic structural material by evaporation from a platinum-antimony source. Cesium can be applied by thermal evaporation from a commercially available getter source, or by exposure to vapor from a thermally heated elemental Cs source. In other embodiments, the entirety of the projections can be formed from the photoemissive material as, for example, by depositing such material in the template. However, the photocathode may include elements that are formed from a metal not normally regarded as a low work function, photoemissive material, without adding any additional coating material. For example, a photocathode having nanowire elements formed entirely from nickel provides measurable photoemission. Although the present invention is not limited by any theory of operation, it is believed that this result is attributable to the emission-enhancing effects of the physical configuration such as field intensification and resonant absorption of light as discussed above.

Although the invention has been described in detail with reference to a preferred embodiment, numerous variations and modifications exist within the scope of the invention as defined by the claims.

What is claimed is:

1. A method of making a photocathode comprising:
    (a) providing a template having a plurality of pores, each of said pores having an open end;
    (b) depositing material in said pores to form elements;
    (c) providing a base for electrically connecting said elements; and
    (d) after said depositing step, removing at least a portion of said template to expose the elements.

2. A method as claimed in claim 1 further comprising the step of coating said exposed elements with a low work function material.

3. A method as claimed in claim 1 wherein said step of providing a template includes anodizing aluminum to form said template.

4. A method as claimed in claim 1 wherein said step of providing a base includes depositing material in said pores until said pores overflow and forms said base as a layer which connects said elements to one another.

5. A method as claimed in claim 1 wherein said step of providing a base includes forming said base at least in part from a portion of said template.

6. A method as claimed in claim 5 wherein said step of exposing said elements includes chemically etching said template.

* * * * *